March 25, 1924.
E. DE Y. HAMMETT
OPERATING RACK
Filed April 9, 1923
1,487,941
2 Sheets-Sheet 1
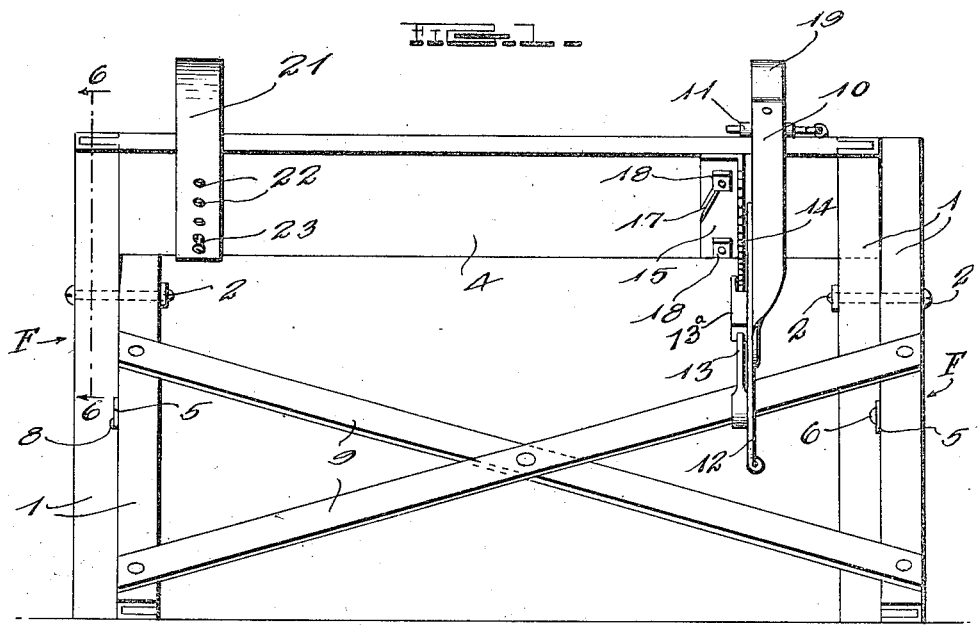
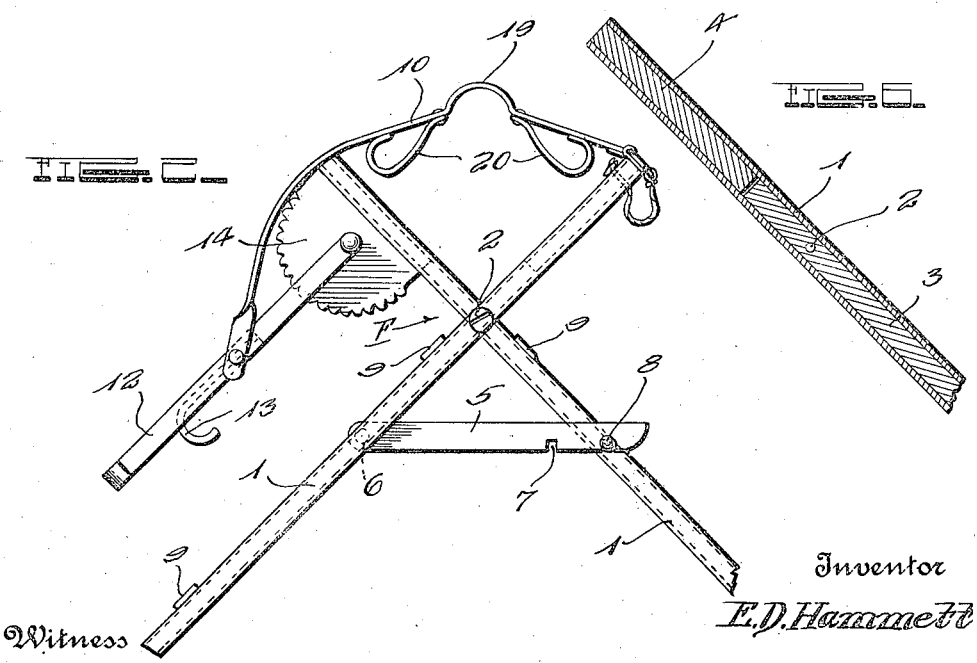

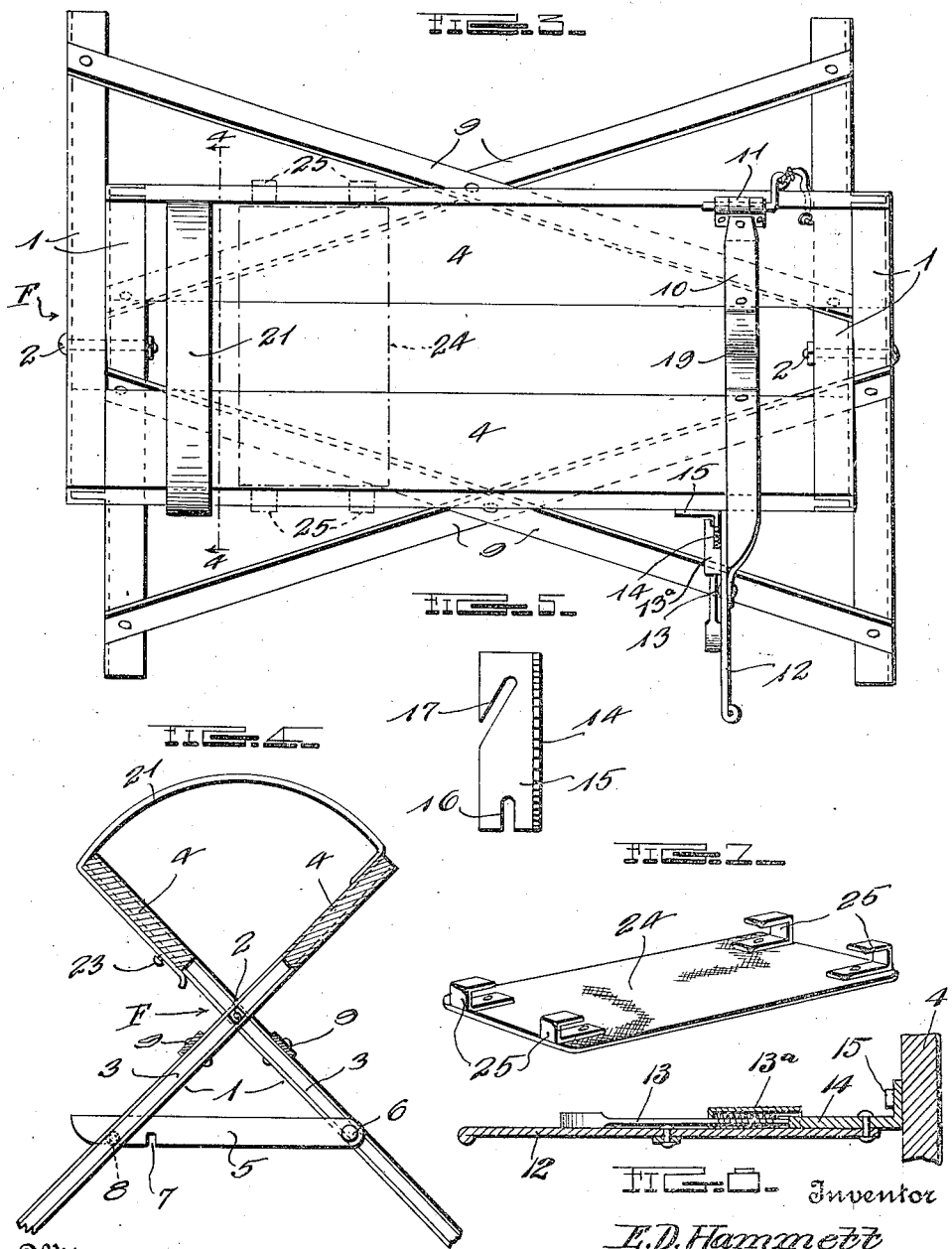

Patented Mar. 25, 1924.

1,487,941

UNITED STATES PATENT OFFICE.

EDWIN DE YAUNY HAMMETT, OF HUNTSVILLE, MISSOURI.

OPERATING RACK.

Application filed April 9, 1923. Serial No. 630,939.

*To all whom it may concern:*

Be it known that I, EDWIN D. HAMMETT, a citizen of the United States, residing at Huntsville, in the county of Randolph and State of Missouri, have invented certain new and useful Improvements in Operating Racks; and I do declare the following to be a full, clear, and exact description of the invention, such as will enable others skilled in the art to which it appertains to make and use the same.

My invention relates to improvements in racks which are used for holding hogs and other animals while vaccinating them or operating in other ways.

One object of the invention is to provide an operating rack of simple and inexpensive construction which may be readily folded to be easily carried from place to place.

Another object is to provide a rack in which a pair of side walls between which the animal is held, may be readily detached, in order that they and adjacent portions of the rack may be thoroughly sterilized to prevent spread of disease.

A still further object is to provide a unique form of strap for holding the animal in the rack, said strap being adapted to extend across the animal's neck and having spaced portions for disposition at opposite sides of the wind-pipe, so that the strap will not cut off the animal's breath.

A still further object is to provide a sling for supporting a portion of the animal's body when performing certain operations, said sling being provided with hooks for detachable engagement with the side walls above referred to.

With the foregoing and minor objects in view, the invention resides in the novel subject matter hereinafter described and claimed, the description being supplemented by the accompanying drawings.

Figure 1 is a side elevation of a rack constructed in accordance with my invention.

Figure 2 is an end elevation.

Figure 3 is a top plan view.

Figure 4 is a vertical transverse sectional view on line 4—4 of Fig. 3.

Figure 5 is a side elevation of the toothed segment for holding the operating lever of the neck strap in adjusted position.

Figure 6 is a detail vertical sectional view on line 6—6 of Fig. 1.

Figure 7 is a perspective view of the sling.

Figure 8 is an enlarged detailed sectional view of the pawl and rack mechanism used in connection with the pivoted strap.

In the drawings above briefly described, the characters F designate a pair of end frames, each consisting of a pair of crossed legs 1 pivoted together between their ends by a bolt or the like 2. The legs of each frame F are preferably formed of channel metal with their channels opening inwardly toward the channels of the other frame, and with the exception of their upper portions, the channels of the legs are filled by wooden bars 3 suitably secured therein, whereby to effectively stiffen said legs. The upper portions of the leg channels removably receive the ends of a pair of horizontal side members 4 which converge downwardly to hold a hog or other animal when the latter is laid upon its back. The lower edges of the side members 4 rest upon the upper ends of the filler bars 3 and said side members are thus held against downward movement. The lower ends of the legs 1 of each end frame are adjustably connected by a bar 5 pivoted at 6 to one leg and having notches 7 to engage a stud 8 on the other leg. Thus, the distance between the side members 4 may be adjusted as required and the legs may then be held against pivotal movement. Furthermore, by entirely releasing the bars 5, the legs may be folded for carrying. The legs of the two end frames at opposite sides of the rack, are connected by crossed brace bars 9 bolted or riveted thereto. whereby the entire rack structure is held in rigid form.

To engage the animal's neck, I provide a transverse spring metal strap 10 which is detachably pivoted at 11 to one of the side members 4, the end of the strap opposite the hinge, being pivoted to a hand lever 12 having a spring-pressed sliding pawl 13 to engage a toothed segment 14 which is detachably secured to the adjacent side member 4. The removable pivot pin referred to is preferably held in place by means of a cord or the like as shown clearly in Figs. 2 and 3. Hence, when the structure is collapsed, the pivot pin will be prevented from being lost. As more clearly seen in Fig. 8, the spring which serves to maintain the pawl engaged with the teeth of the rack 14 is housed in an elongated casing 13ª which is secured to and carried by the pivoted hand lever 12. The segment 14 is preferably provided with a lateral attaching flange 15 having a vertical slot 16 in its lower end, and an oblique slot 17 near its upper end, said slots receiving attaching bolts 18 as shown in Fig. 1. While this arrangement will rigidly secure the segment in place for use, it may readily be removed when it is desired to fold the rack for carrying the latter from one place to another.

In the construction shown, the strap 10 is arched as indicated at 19 to extend over the animal's wind-pipe, and said strap is provided with a plurality of downwardly bowed springs 20 which contact with the neck at opposite sides of the wind-pipe. Thus, the animal's head and neck are effectively held in place, but his breath is not shut off.

To co-operate with the strap 10 in securing the animal in the rack, I prefer to employ a second strap 21 at the opposite end of the rack, this strap being secured at one end to one of the side members 4 and having openings 22 in its other end to engage a pin 23 on the outer side of the other side member.

When performing certain operations, it is desirable to support a portion of the animal's back above the side members 4 and for this purpose, I have provided a flexible sling 24 having hooks 25 on its ends to hook over the upper edges of the side members, as will be clear by reference to Figs. 3 and 7.

By employing the construction shown, a rack is provided which is simple and inexpensive, yet will be highly efficient and desirable. Whenever required, the neck strap 10, the lever 12 and the segment 14 may be detached, permitting the legs 1 of the end frames to move upon their pivots 2 when the bars 5 are released, thus bringing the side members or walls 4 into contact with each other and producing a compact structure for carrying from place to place. Also, whenever it is desired, it will be seen that the side members 4 may be removed from engagement with the leg channels of the end frames F, which is particularly advantageous when sterilizing the rack to prevent possible spreading of disease.

As excellent results may be obtained from the details disclosed, they may be followed if desired. However, within the scope of the invention as claimed, numerous changes may be made.

I claim:

1. A device of the class described comprising a pair of spaced end frames each comprising two crossed legs pivoted to each other between their ends, said legs being formed of channel metal with the channels of each frame facing inwardly toward those of the other frame, filling bars secured in said channels and extending from the lower ends of said legs to points above their pivots, a pair of longitudinal side members extending between said end frames and received removably in the upper ends of the leg channels, said side members converging downwardly to form an animal holder, means tying the two end frames together, and releasable connecting means between the legs of each frame for limiting the pivotal movement thereof.

2. A device of the class described comprising a support on which an animal is held upon his back, and a neck strap connected with said support and adapted to be drawn tightly across the animal's neck, said strap having spaced portions to engage the neck at opposite sides of the wind-pipe without cutting off the animal's breath.

3. A device of the class described comprising a support on which an animal is held upon his back, and a neck strap connected with said support and adapted to be drawn tightly across the animal's neck, said strap having spaced springs to engage the neck at opposite sides of the wind-pipe without cutting off the animal's breath.

4. A device of the class described comprising a support on which an animal is held upon his back, a resilient metal strap connected at one end to said support and adapted to pass across the animal's neck, a lever fulcrumed on said support and connected with the other end of said strap for drawing the latter tightly in place, means for holding said lever, and a pair of spaced springs carried by said lever to yieldably engage the neck at opposite sides of the wind-pipe.

In testimony whereof I have hereunto affixed my signature.

EDWIN DE YAUNY HAMMETT.